US012386298B2

(12) United States Patent
Zhang et al.

(10) Patent No.: US 12,386,298 B2
(45) Date of Patent: Aug. 12, 2025

(54) FIXING DEVICE INCLUDING ELASTIC PLATE FOR NIPPING ENDLESS BELT IN COOPERATION WITH HEATING ROLLER, AND HOLDER HAVING SUPPORTING SURFACES FOR SUPPORTING ELASTIC PLATE

(71) Applicant: BROTHER KOGYO KABUSHIKI KAISHA, Nagoya (JP)

(72) Inventors: Mingguang Zhang, Nagoya (JP); Tokifumi Tanaka, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/518,149

(22) Filed: Nov. 22, 2023

(65) Prior Publication Data

US 2024/0201624 A1 Jun. 20, 2024

(30) Foreign Application Priority Data

Dec. 14, 2022 (JP) ................................ 2022-199079

(51) Int. Cl.
*G03G 15/20* (2006.01)

(52) U.S. Cl.
CPC ..... *G03G 15/2064* (2013.01); *G03G 15/2017* (2013.01); *G03G 15/2028* (2013.01);
(Continued)

(58) Field of Classification Search
CPC ........... G03G 15/2017; G03G 15/2028; G03G 15/206; G03G 15/2064; G03G 2215/20;
(Continued)

(56) References Cited

U.S. PATENT DOCUMENTS

| | | | |
|---|---|---|---|
| 2002/0061211 A1 | 5/2002 | Kamijo et al. |
| 2003/0016974 A1 | 1/2003 | Kiuchi |

(Continued)

FOREIGN PATENT DOCUMENTS

| | | | |
|---|---|---|---|
| JP | H08-211768 A | 8/1996 |
| JP | 2002-082565 A | 3/2002 |

(Continued)

*Primary Examiner* — Joseph S Wong
(74) *Attorney, Agent, or Firm* — Baker Botts L.L.P.

(57) ABSTRACT

A fixing device includes a heating roller and a pressure unit configured to nip a sheet therebetween to thermally fix a toner image onto the sheet. The pressure unit includes: an endless belt; an elastic plate; and a holder having an upstream supporting surface and a downstream supporting surface. The elastic plate has: a nip-forming surface having at least a portion for nipping the endless belt in cooperation with the heating roller to form a nipping region between the nip-forming surface and the heating roller; an upstream supported surface in contact with and supported by the upstream supporting surface; a downstream supported surface in contact with and supported by the downstream supporting surface; an upstream connecting surface connecting the nip-forming surface and the upstream supported surface to each other; and a downstream connecting surface connecting the nip-forming surface and the downstream supported surface to each other.

20 Claims, 10 Drawing Sheets

(52) U.S. Cl.
CPC ....... *G03G 15/2053* (2013.01); *G03G 15/206* (2013.01); *G03G 2215/20* (2013.01); *G03G 2215/2003* (2013.01); *G03G 2215/2009* (2013.01); *G03G 2215/2032* (2013.01)

(58) Field of Classification Search
CPC ... G03G 2215/2003; G03G 2215/2009; G03G 2215/2032
See application file for complete search history.

(56) References Cited

U.S. PATENT DOCUMENTS

| | | | | |
|---|---|---|---|---|
| 2006/0216077 | A1* | 9/2006 | Komuro | G03G 15/206 399/329 |
| 2011/0262193 | A1 | 10/2011 | Kimura | |
| 2012/0251206 | A1 | 10/2012 | Nakamura et al. | |
| 2020/0103798 | A1* | 4/2020 | Tanaka | G03G 15/2017 |

FOREIGN PATENT DOCUMENTS

| | | | |
|---|---|---|---|
| JP | 2005-043742 | A | 2/2005 |
| JP | 2011-227377 | A | 11/2011 |
| JP | 2012-208308 | A | 10/2012 |
| JP | 2016-212141 | A | 12/2016 |

* cited by examiner

FIXING DEVICE INCLUDING ELASTIC PLATE FOR NIPPING ENDLESS BELT IN COOPERATION WITH HEATING ROLLER, AND HOLDER HAVING SUPPORTING SURFACES FOR SUPPORTING ELASTIC PLATE

REFERENCE TO RELATED APPLICATIONS

This application claims priority from Japanese Patent Application No. 2022-199079 filed on Dec. 14, 2022. The entire content of the priority application is incorporated herein by reference.

BACKGROUND ART

A conventional fixing device including a heating roller and a pressure-applying belt is known in the art. In this conventional fixing device, the heating roller and the pressure-applying belt nip a sheet therebetween and convey the sheet in a conveying direction to thermally fix a toner image to the sheet.

The pressure-applying belt includes a belt body, a leaf spring, and a seat part. The belt body rotates while in contact with the heating roller. The leaf spring extends along a rotational axis of the heating roller. The leaf spring makes contact with an inner circumferential surface of the belt body to nip the belt body in cooperation with the heating roller. The seat part extends along the rotational axis of the heating roller and supports the leaf spring inside the belt body.

The leaf spring has a base-end portion supported by the seat part, a folded portion folded back from an upstream edge in the conveying direction of the base-end portion to form a U-shape, and a free-end portion extending downstream in the conveying direction from an upper edge of the folded portion to oppose the base-end portion. An urging surface on the free-end portion nips the belt body in cooperation with the heating roller to form a nipping region.

DESCRIPTION

However, in the conventional fixing device described above, a downstream edge in the conveying direction of the free-end portion of the leaf spring is not supported by the seat part. Consequently, a length in the conveying direction of the nipping region cannot easily be increased, and hence, performance of the conventional fixing device for fixing toner images cannot easily be improved.

In view of the foregoing, it is an object of the present disclosure to provide a fixing device capable of increasing a length in a conveying direction of a nipping region and improving performance for fixing toner images.

In order to attain the above and other objects, according to one aspect, the present disclosure provides a fixing device including: a heating roller; and a pressure unit. The heating roller is rotatable about a rotational axis extending in a rotational axis direction. The pressure unit is configured to nip a sheet and convey the sheet in a conveying direction in cooperation with the heating roller and to thermally fix a toner image onto the sheet. The pressure unit includes: an endless belt; an elastic plate; and a holder. The endless belt is rotatable while in contact with the heating roller. The elastic plate extends in the rotational axis direction. The elastic plate makes contact with an inner peripheral surface of the endless belt to nip the endless belt in cooperation with the heating roller. The holder extends in the rotational axis direction. The holder is positioned within a space encircled by the endless belt and supports the elastic plate. The holder has: an upstream supporting surface; and a downstream supporting surface. The upstream supporting surface faces the heating roller. The downstream supporting surface is positioned further downstream than the upstream supporting surface in the conveying direction. The downstream supporting surface faces the heating roller. The elastic plate has: a nip-forming surface; an upstream supported surface; a downstream supported surface; an upstream connecting surface; and a downstream connecting surface. The nip-forming surface has at least a portion for nipping the endless belt in cooperation with the heating roller to form a nipping region between the nip-forming surface and the heating roller. The upstream supported surface is in contact with and supported by the upstream supporting surface. The downstream supported surface is in contact with and supported by the downstream supporting surface. The upstream connecting surface connects the nip-forming surface and the upstream supported surface to each other. The upstream connecting surface is curved when viewed in the rotational axis direction. The downstream connecting surface connects the nip-forming surface and the downstream supported surface to each other. The downstream connecting surface is curved when viewed in the rotational axis direction.

In the above structure, the elastic plate is supported while the upstream supported surface is in contact with and supported by the upstream supporting surface and the downstream supported surface is in contact with and supported by the downstream supporting surface. In other words, the elastic plate is supported by the holder through contact with the holder at two positions.

With this structure, when the elastic plate is elastically deformed, the fixing device can reliably suppress a downstream end in the conveying direction of the nip-forming surface from separating from the heating roller and can reliably maintain the nip-forming surface in a curved state along an outer circumferential surface of the heating roller. As a result, the fixing device can increase a surface area of a portion of the nip-forming surface that nips the endless belt in cooperation with the heating roller. Hence, the fixing device can increase a length in the conveying direction of the nipping region, thereby improving the ability of the fixing device for fixing toner images.

Figure 1:
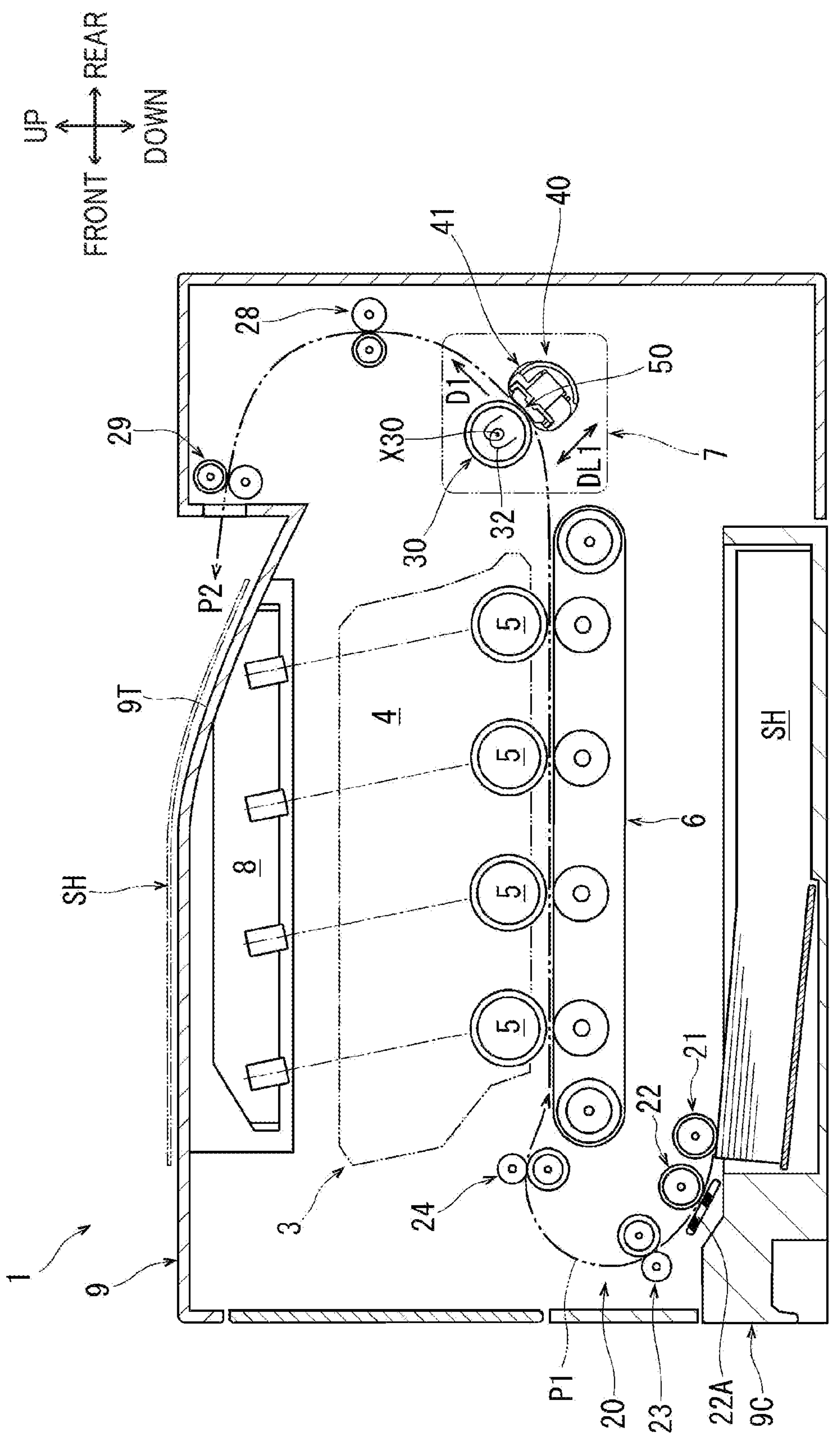
FIG. 1 is a schematic cross-sectional view of an image-forming apparatus including a fixing device.

Hereinafter, one embodiment of the present disclosure will be described while referring to the accompanying drawings.

A fixing device 7 according to the present embodiment serves as an example of the fixing device of the present disclosure. The fixing device 7 is provided in an image-forming apparatus 1 and constitutes an image-forming unit 3. The image-forming apparatus 1 is an electrophotographic type color printer configured to form images in a plurality of colors on sheets SH.

<Overall Configuration of Image-Forming Apparatus>

The image-forming apparatus 1 includes a device body 9 having a substantially box-like shape, and also includes the image-forming unit 3, a sheet tray 9C, a feeding unit 20, a pair of auxiliary discharging rollers 28, and a pair of discharging rollers 29 which are accommodated in the device body 9.

The sheet tray 9C is positioned further downward than the image-forming unit 3. The sheet tray 9C is configured to accommodate therein sheets SH that have no images formed thereon in a stacked state. The sheets SH may be paper, transparencies, and the like.

A discharge tray 9T is formed on an upper surface of the device body 9. The discharge tray 9T supports the sheets SH having images formed thereon.

A width direction of the device body 9 is a direction orthogonal to both a front-rear direction and an up-down direction. A width direction of the sheets SH conveyed from the sheet tray 9C and discharged onto the discharge tray 9T is identical to the width direction of the device body 9. The front-rear direction, the up-down direction, and the width direction illustrated in FIG. 2 and subsequent drawings are displayed to correspond to those in FIG. 1.

The feeding unit 20 is positioned further frontward than the image-forming unit 3. The feeding unit 20 includes a feeding roller 21, a separating roller 22, a separating pad 22A, a pair of first conveying rollers 23, and a pair of second conveying rollers 24 which are arranged along a conveying path P1.

The conveying path P1 initially extends diagonally upward and frontward from a front end portion of the sheet tray 9C before making a U-turn and extending rearward toward the image-forming unit 3.

The feeding roller 21 is configured to feed the sheets SH accommodated in the sheet tray 9C onto the conveying path P1. The separating roller 22 and the separating pad 22A separate the sheets SH one by one when the feeding roller 21 conveys a plurality of sheets SH at a time.

The first conveying rollers 23 and the second conveying rollers 24 are configured to nip each sheet SH individually separated by the separating roller 22 and the separating pad 22A and to convey the separated sheets SH toward the image-forming unit 3.

The image-forming unit 3 employs a direct transfer color electrophotographic system. The image-forming unit 3 includes a process cartridge 4, a transfer belt 6, a scanning unit 8, and the fixing device 7.

The process cartridge 4 is an aggregate of four cartridges arranged in series along the front-rear direction. The four cartridges correspond to toner in four colors of black, yellow, magenta, and cyan. The process cartridge 4 includes four photosensitive members 5 that correspond to the respective colors of toner. Although not illustrated in the drawings, the process cartridge 4 further includes developing rollers, chargers, toner-accommodating units, and the like. Rotational axes of the photosensitive members 5 extend in the width direction of the device body 9. The transfer belt 6 faces each of the photosensitive members 5 from below.

The scanning unit 8 includes laser light sources, a polygon mirror, fθ lenses, reflecting mirrors, and the like. The scanning unit 8 is configured to emit laser beams from above to irradiate the photosensitive members 5 in the process cartridge 4 with the laser beams.

As the photosensitive members 5 rotate in the process cartridge 4, surfaces of the photosensitive members 5 are uniformly positively charged by the chargers, and are exposed to light by being scanned at a high speed with laser beams emitted from the scanning unit 8. Through this process, electrostatic latent images corresponding to images to be formed on the sheets SH are formed on the surfaces of the respective photosensitive members 5.

Next, toner is supplied from the toner-accommodating units onto areas of the surfaces on the photosensitive members 5 that correspond to the electrostatic latent images to form toner images. As the sheet SH passes between the process cartridge 4 and the transfer belt 6, an upper surface of the sheet SH that faces upward opposes the photosensitive members 5, and the toner images carried on the surfaces of the photosensitive members 5 are transferred onto the upper surface of the sheet SH.

The fixing device 7 is positioned further rearward than the process cartridge 4. The fixing device 7 includes a heating roller 30, and a pressure unit 40.

While heated, the heating roller 30 is rotatable about a rotational axis X30 parallel to the width direction. The pressure unit 40 is positioned further downward and rearward than the heating roller 30, and is pressed against the heating roller 30. A direction DLI illustrated in the drawings indicates a direction in which the heating roller 30 and the pressure unit 40 are aligned.

The fixing device 7 heats the sheet SH while nipping and conveying the sheet S in a conveying direction D1 using the heating roller 30 and the pressure unit 40, thereby thermally fixing the toner image to the sheet SH. The conveying direction D1 is a direction orthogonal to both the width direction and the direction DLI in which the heating roller 30 and the pressure unit 40 are aligned, and is sloped upward toward the rear.

The auxiliary discharging rollers 28 and the discharging rollers 29 are disposed along a discharging path P2. The discharging path P2 is a path along which the sheets SH that have passed through the fixing device 7 are guided upward before making a U-turn so that the sheets SH are discharged onto the discharge tray 9T while a surface of the sheets SH on which the image has been formed faces downward.

The auxiliary discharging rollers 28 are positioned further upward and rearward than the fixing device 7. The discharging rollers 29 are positioned farther frontward than the auxiliary discharging rollers 28, and further upward than a rear end of the discharge tray 9T.

The auxiliary discharging rollers 28 nip the sheet SH conveyed along the discharging path P2 and convey the sheet SH toward the discharging rollers 29. The discharging rollers 29 then nip the sheet SH and discharge the sheet SH onto the discharge tray 9T.

<Heating Roller of Fixing Device>

Figure 2:
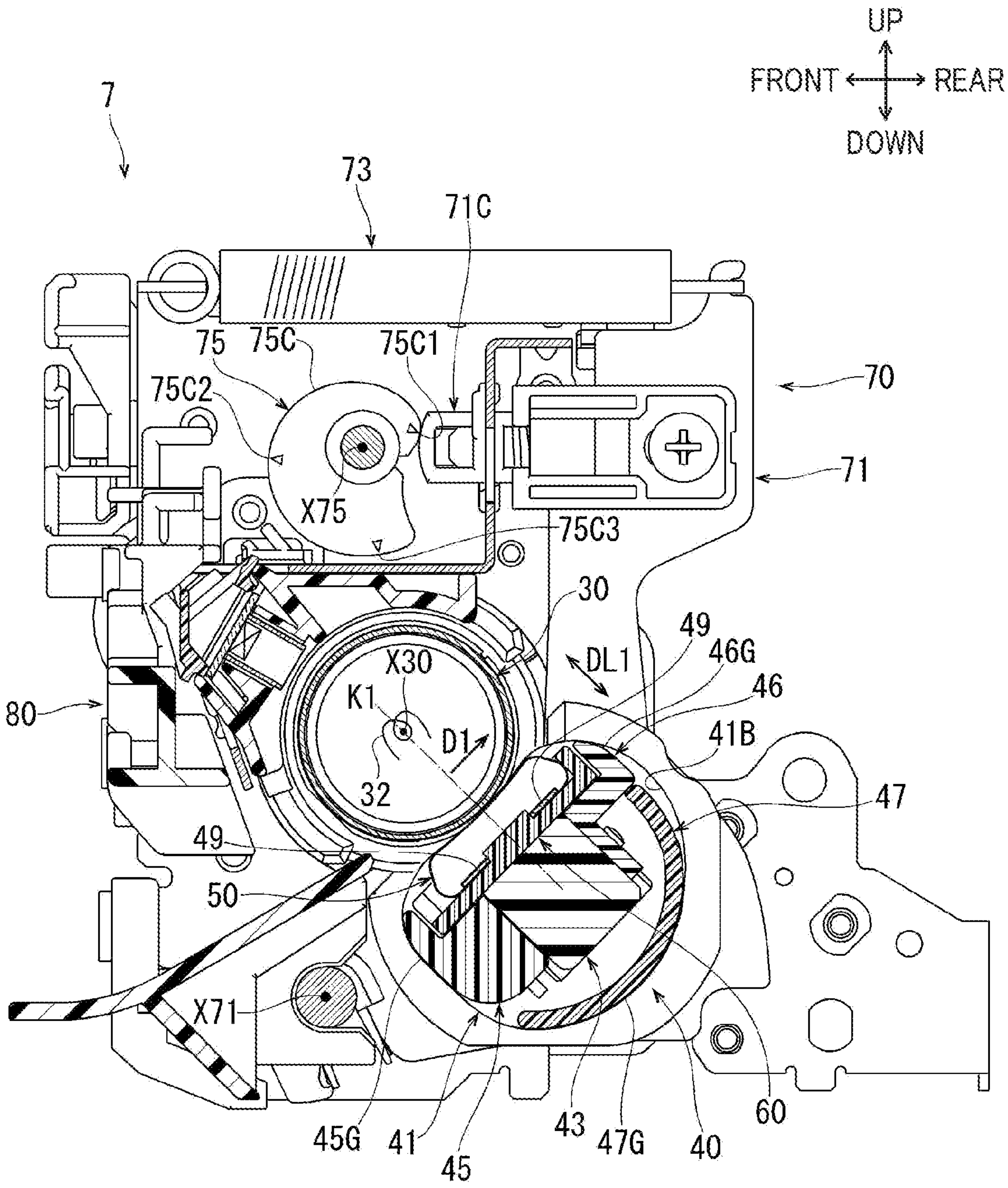
FIG. 2 is a cross-sectional view of the fixing device.

As illustrated in FIG. 2, the heating roller 30 of the fixing device 7 is a hollow cylindrical rotating body configured of a thin-walled cylinder formed of metal and centered on the rotational axis X30, a thin elastic layer formed on a surface of the cylinder, and a release layer formed on a surface of the elastic layer. Both ends of the heating roller 30 in a rotational axis X30 direction (a direction in which the rotational axis X30 extends) are rotatably supported by a fixing frame 80.

The heating roller 30 is heated by a halogen heater 32 disposed inside the heating roller 30. The heating roller 30 rotates about the rotational axis X30 by a drive force transmitted from a drive source (not illustrated). The release layer forming a surface of the heating roller 30 makes contact with the sheet SH that has passed between the process cartridge 4 and the transfer belt 6.

<Pressure Unit of Fixing Device>

The pressure unit 40 includes an endless belt 41, a stay 43, a first belt guide 45, a second belt guide 46, third belt guides 47, a holder 60, a leaf spring 50, and a pair of holding members 49. The leaf spring 50 is an example of the elastic plate of the present disclosure.

The endless belt 41 is a flexible tubular body formed of a heat-resistant thin resin sheet. In the present embodiment, the endless belt 41 is made of polyimide resin. The endless belt 41 circularly moves while in contact with the heating roller 30.

The stay 43, the first through third belt guides 45, 46, and 47, the holder 60, the leaf spring 50, and the pair of holding members 49 are all positioned within a space encircled by the endless belt 41.

The stay 43 and the holder 60 are members formed of heat-resistant resin. The first through third belt guides 45, 46, and 47 are members formed of heat-resistant resin having a good sliding property. The holding members 49 are flat plate members made of steel.

The leaf spring 50 is a plate-shaped elastic body with high elastic deformability. The leaf spring 50 is made of metal material such as spring steel, resin material, composite material such as CFRP (Carbon Fiber Reinforced Plastics), or the like. Preferably, a surface of the leaf spring 50 is subjected to a surface treatment to create a good sliding property. In the present embodiment, the leaf spring 50 is made of stainless steel leaf spring that has been bent, and the surface of the leaf spring 50 has been treated with a nickel-phosphorus plating, a fluorine-based coating, or the like. Lubricant such as grease is applied between the leaf spring 50 and the endless belt 41.

Figure 3:
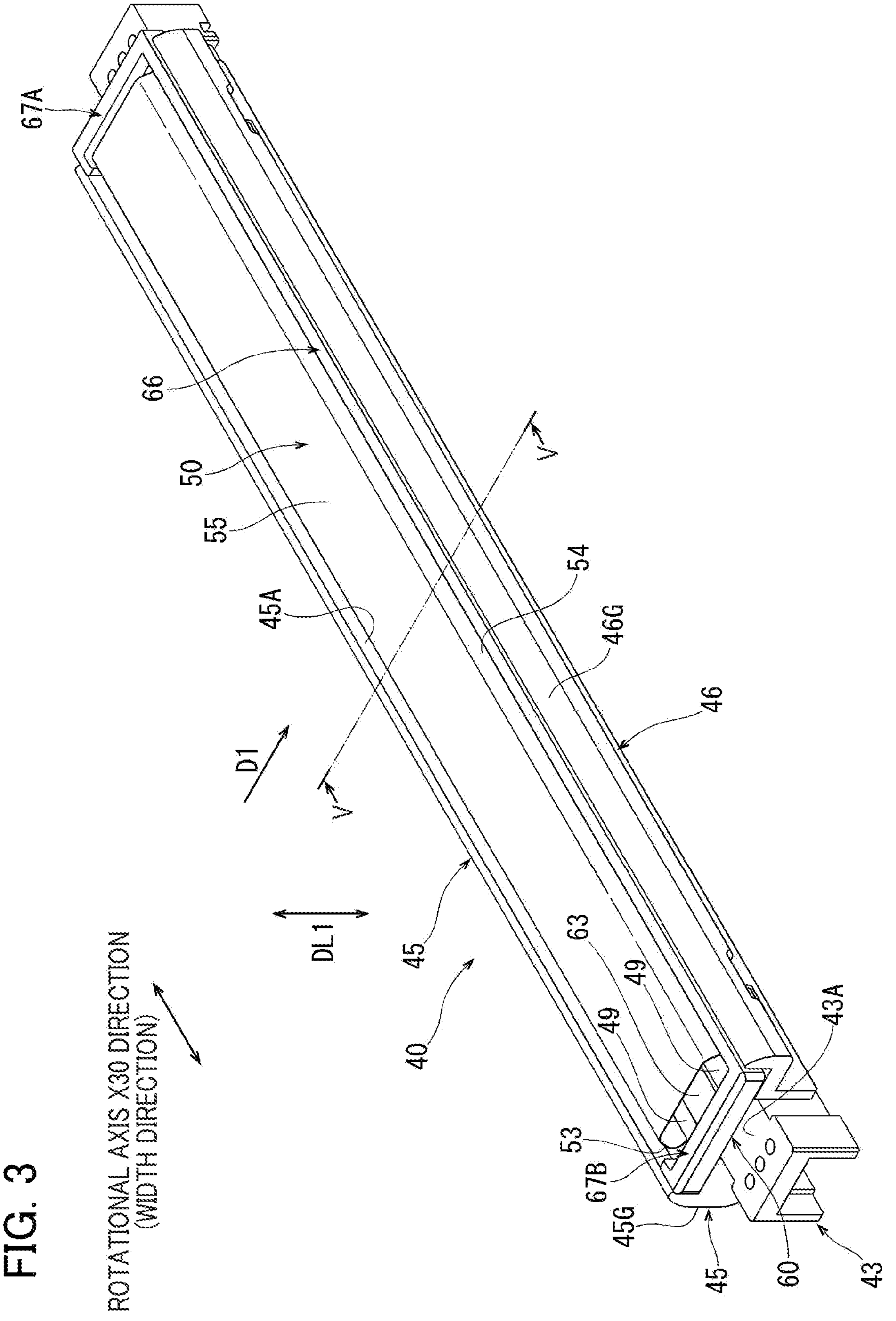
FIG. 3 is a perspective view of a stay, a first belt guide, a second belt guide, a holder, a leaf spring, and a pair of holding members in a pressure unit.
Figure 4:
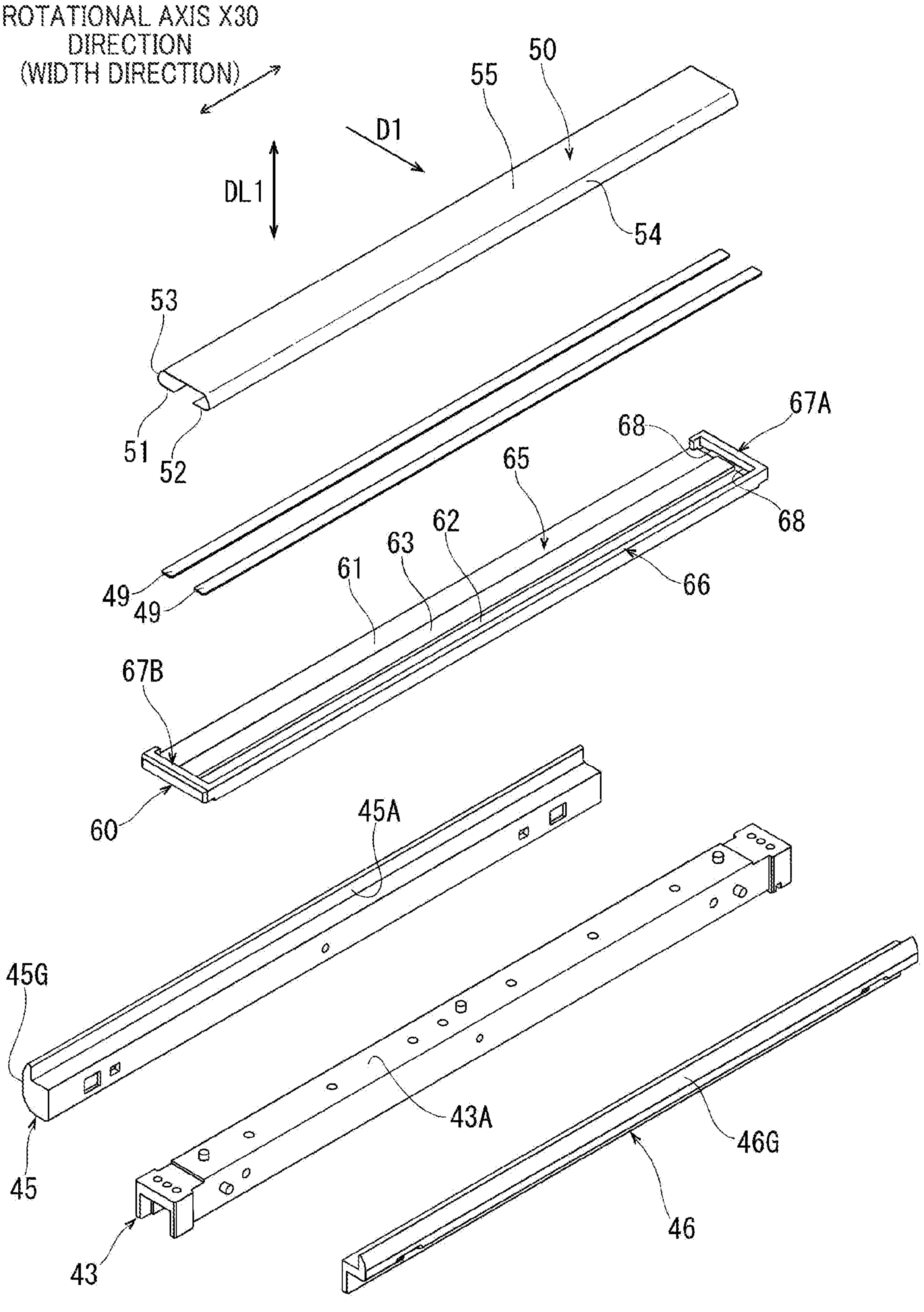
FIG. 4 is an exploded perspective view of the stay, the first belt guide, the second belt guide, the holder, the leaf spring, and the pair of holding members in the pressure unit.

As illustrated in FIGS. 3 and 4, the stay 43, the first and second belt guides 45 and 46, the holder 60, the leaf spring 50, and the pair of holding members 49 all extend in the rotational axis X30 direction. Although not illustrated in the drawings in detail, the third belt guide 47 is provided on each end of the pressure unit 40 in the rotational axis X30 direction.

<Stay and First through Third Belt Guides>

Figure 5:
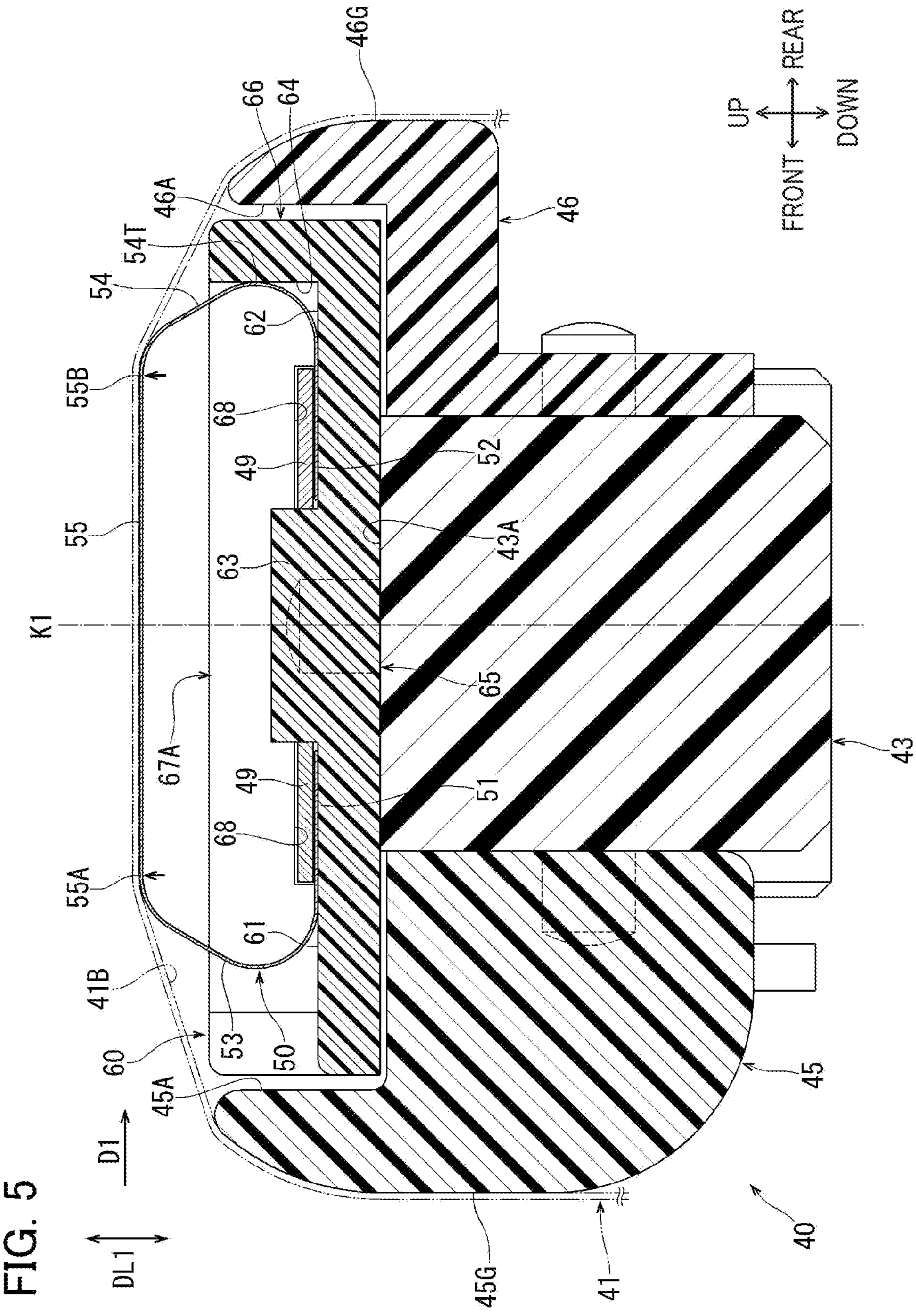
FIG. 5 is a cross-sectional view taken along line V-V in FIG. 3.

As illustrated in FIG. 5, the stay 43 is a rod-like body having a substantially rectangular cross section. The first and second belt guides 45 and 46 and the holder 60 are respectively fixed to the stay 43 by fitting together convex and concave parts provided in a plurality of locations.

As illustrated in FIG. 3, both ends in the rotational axis X30 direction of the stay 43 protrude further outward than the first and second belt guides 45 and 46 and the holder 60 in the rotational axis X30 direction.

As illustrated in FIG. 5, a back surface of the holder 60 that faces away from the heating roller 30 in the direction DLI in which the heating roller 30 and the pressure unit 40 are aligned is in contact with a base surface 43A of the stay 43 that faces the heating roller 30.

The first belt guide 45 is connected to the stay 43 on a side of the back surface of the holder 60. The second belt guide 46 is also connected to the stay 43 on the side of the back surface of the holder 60.

A surface of the first belt guide 45 that faces upstream in the conveying direction D1 will be referred to as a first guide surface 45G. The first guide surface 45G is curved so as to expand upstream in the conveying direction D1. The first guide surface 45G protrudes toward the heating roller 30 on the upstream side of the holder 60 in the conveying direction D1. The first belt guide 45 also has an opposing surface 45A that faces downstream in the conveying direction D1 and opposes the holder 60.

A surface of the second belt guide 46 that faces downstream in the conveying direction D1 will be referred to as a second guide surface 46G. The second guide surface 46G is curved so as to expand downstream in the conveying direction D1. The second guide surface 46G protrudes toward the heating roller 30 on the downstream side of the holder 60 in the conveying direction D1. The second belt guide 46 has an opposing surface 46A that faces upstream in the conveying direction D1 and opposes the holder 60.

As illustrated in FIG. 2, the third belt guides 47 are fixed to the stay 43 via intermediate members (not illustrated). Curved surfaces of the third belt guides 47 that face away from the heating roller 30 will be referred to as third guide surfaces 47G.

The first through third guide surfaces 45G, 46G, and 47G make contact with an inner peripheral surface 41B of the endless belt 41 to guide circular movement of the endless belt 41.

<Holder>

As illustrated in FIGS. 4 and 5, the holder 60 includes a base plate 65, a restricting wall 66, and side walls 67A and 67B.

The base plate 65 has a substantially flat plate shape that extends in both the rotational axis X30 direction and the conveying direction D1. A length in the rotational axis X30 direction of the base plate 65 is significantly greater than a length in the conveying direction D1 of the base plate 65.

A back surface of the base plate 65 is a flat surface that constitutes the back surface of the holder 60. On a side opposing the heating roller 30, the base plate 65 includes a projection 63, and has an upstream supporting surface 61, and a downstream supporting surface 62.

The projection 63 protrudes slightly toward the heating roller 30 from a middle portion in the conveying direction D1 of the base plate 65, and is elongated in the rotational axis X30 direction.

The upstream supporting surface 61 is positioned further upstream than the projection 63 in the conveying direction D1. The upstream supporting surface 61 is a flat surface extending in both the rotational axis X30 direction and the conveying direction D1. The upstream supporting surface 61 faces the heating roller 30.

The downstream supporting surface 62 is positioned further downstream than the upstream supporting surface 61 and the projection 63 in the conveying direction D1. The downstream supporting surface 62 is also a flat surface extending in both the rotational axis X30 direction and the conveying direction D1. The downstream supporting surface 62 faces the heating roller 30. In the present embodiment, the upstream supporting surface 61 and the downstream supporting surface 62 are on the same plane and are a step lower than the projection 63.

The restricting wall 66 is connected to an edge of the base plate 65 that is positioned further downstream than the downstream supporting surface 62 in the conveying direction D1. The restricting wall 66 protrudes farther than the projection 63 toward the heating roller 30 and is elongated in the rotational axis X30 direction.

As illustrated in FIG. 5, the restricting wall 66 has a restricting surface 64. The restricting surface 64 is a flat surface of the restricting wall 66 that faces upstream in the conveying direction D1, and that extends in both the direction DLI in which the heating roller 30 and the pressure unit 40 are aligned and the rotational axis X30 direction. The restricting surface 64 is positioned further downstream than the downstream supporting surface 62 in the conveying direction D1 and is positioned closer to the heating roller 30 than the downstream supporting surface 62 is to the heating roller 30.

The upstream supporting surface 61 has a length in the conveying direction D1 is greater than a length in the conveying direction D1 of the downstream supporting surface 62. At a position further upstream than the upstream supporting surface 61 in the conveying direction D1 on the base plate 65, the holder 60 does not have a wall like the restricting wall 66.

A line passing through the rotational axis X30 of the heating roller 30 and orthogonal to both the upstream supporting surface 61 and the downstream supporting surface 62 will be referred to as a virtual line K1. The virtual line K1 is parallel to the direction DLI in which the heating roller 30 and the pressure unit 40 are aligned, and is orthogonal to the conveying direction D1. A center in the conveying direction D1 of the projection 63 is positioned on the virtual line K1.

As illustrated in FIGS. 4 and 5, the side wall 67A is positioned on one end portion in the rotational axis X30 direction of the base plate 65. The side wall 67A protrudes farther toward the heating roller 30 than the projection 63, and is elongated in the conveying direction D1.

The side wall 67A has a pair of engagement holes 68 aligned in the conveying direction D1. The pair of engagement holes 68 penetrates a lower end of the side wall 67A in the rotational axis X30 direction. The holding members 49 are engaged with the holder 60 by fitting one end of each holding member 49 in the rotational axis X30 direction into a corresponding engagement hole 68 of the side wall 67A.

As illustrated in FIG. 4, the side wall 67B is positioned on another end portion in the rotational axis X30 direction of the base plate 65. Since the side wall 67B is a mirror image of the side wall 67A and has a similar configuration, a description of the side wall 67B will be omitted.

Although not illustrated in the drawings, the side wall 67B has a pair of engagement holes 68 aligned in the conveying direction D1 and penetrating a lower end of the side wall 67B in the rotational axis X30 direction, as with the side wall 67A described above. The holding members 49 are engaged with the holder 60 by fitting another end of each holding member 49 in the rotational axis X30 direction into a corresponding engagement hole 68 of the side wall 67B.

<Leaf Spring>

As illustrated in FIGS. 4 and 5, the leaf spring 50 is a thin plate formed of a leaf spring material and bent to have a substantially trapezoidal shape when viewed in the rotational axis X30 direction. Corners of the trapezoid-like leaf spring 50 are curved, while a center portion of a bottom portion is missing.

The leaf spring 50 has a nip-forming surface 55, an upstream supported surface 51, a downstream supported surface 52, an upstream connecting surface 53, and a downstream connecting surface 54.

As illustrated in FIG. 5, the nip-forming surface 55 is positioned closer to the heating roller 30 than the upstream supporting surface 61, the downstream supporting surface 62, and the projection 63 of the holder 60 are to the heating roller 30, and extends in both the rotational axis X30 direction and the conveying direction D1. The nip-forming surface 55 faces the heating roller 30.

In a state where the leaf spring 50 is not elastically deformed, the nip-forming surface 55 is formed in a linear shape from an upstream end 55A to a downstream end 55B in the conveying direction D1 when viewed in the rotational axis X30 direction. A center in the conveying direction D1 of the nip-forming surface 55 is positioned on the virtual line K1.

The upstream supported surface 51 is positioned further upstream than the projection 63 in the conveying direction D1. The upstream supported surface 51 faces away from the heating roller 30, and extends in both the rotational axis X30 direction and the conveying direction D1. The upstream supported surface 51 is in contact with and is supported by the upstream supporting surface 61.

The downstream supported surface 52 is positioned further downstream than the upstream supported surface 51 and the projection 63 in the conveying direction D1. The downstream supported surface 52 faces away from the heating roller 30, and extends in both the rotational axis X30 direction and the conveying direction D1. The downstream supported surface 52 is in contact with and is supported by the downstream supporting surface 62.

The upstream connecting surface 53 is positioned further upstream than the upstream end 55A in the conveying direction D1 of the nip-forming surface 55 in the conveying direction D1. The upstream connecting surface 53 connects the upstream end 55A of the nip-forming surface 55 and the upstream supported surface 51 to each other. The upstream connecting surface 53 is curved when viewed in the rotational axis X30 direction. That is, the upstream connecting surface 53 is curved so as to expand upstream in the conveying direction D1.

The downstream connecting surface 54 is positioned further downstream than the downstream end 55B in the conveying direction D1 of the nip-forming surface 55 in the conveying direction D1. The downstream connecting surface 54 connects the downstream end 55B of the nip-forming surface 55 and the downstream supported surface 52 to each other. The downstream connecting surface 54 is curved when viewed in the rotational axis X30 direction. That is, the downstream connecting surface 54 is curved so as to expand downstream in the conveying direction D1. The downstream connecting surface 54 is in contact with and is supported by the restricting surface 64.

In a state where the leaf spring 50 is not elastically deformed, a portion 54T of the downstream connecting surface 54 that makes contact with the restricting surface 64 is positioned closer to the downstream supported surface 52 than to the nip-forming surface 55 in the direction DLI in which the heating roller 30 and the pressure unit 40 are aligned.

In this way, the holder 60 supports the leaf spring 50 inside the endless belt 41.

The holding members 49 respectively hold flat plate-shaped portions of the leaf spring 50 on which the upstream supported surface 51 and the downstream supported surface 52 are formed. As a result, the holding members 49 restrict the upstream supported surface 51 from separating from the upstream supporting surface 61 and restrict the downstream supported surface 52 from separating from the downstream supporting surface 62.

The downstream supported surface 52 is restricted from moving upstream in the conveying direction D1 by a surface of the projection 63 that faces downstream in the conveying direction D1. The downstream supported surface 52 is also restricted from moving downstream in the conveying direction D1 by the contact between the downstream connecting surface 54 and the restricting surface 64. In other words, the downstream supported surface 52 is in contact with the downstream supporting surface 62 while the downstream supported surface 52 is not movable in the conveying direction D1.

The upstream supported surface 51 is restricted from moving downstream in the conveying direction D1 by a surface of the projection 63 that faces upstream in the conveying direction D1. However, the holder 60 has no member for restricting the upstream supported surface 51 from moving upstream in the conveying direction D1. In other words, the upstream supported surface 51 is in contact with the upstream supporting surface 61 while the upstream supported surface 51 is movable upstream in the conveying direction D1.

<Urging Mechanism>

As illustrated in FIG. 2, the fixing device 7 also includes urging mechanisms 70. The urging mechanism 70 is provided on each side of the fixing device 7 in the width direction. Each of the urging mechanisms 70 includes an arm 71, a tension coil spring 73, and a cam 75. FIG. 2 illustrates the arm 71, the tension coil spring 73, and the cam 75 of the urging mechanism 70 provided on one side in the width direction of the fixing device 7.

The arm 71 is a sheet metal member having a substantially L-shape when viewed in the rotational axis X30 direction. The arm 71 is supported by the fixing frame 80 so as to be pivotally movable about a pivot axis X71. The pivot axis X71 extends parallel to the rotational axis X30 at a position further downward than the heating roller 30 and further frontward than the pressure unit 40.

The arm 71 extends rearward from the pivot axis X71, changing orientation thereof at a position downward of the pressure unit 40, and extending upward. A portion of the arm 71 that changes the orientation thereof from rearward to upward supports a corresponding outer end in the rotational axis X30 direction of the stay 43.

As the arm 71 pivotally moves counterclockwise in FIG. 2 about the pivot axis X71, the pressure unit 40 approaches the heating roller 30. Conversely, as the arm 71 pivotally moves clockwise in FIG. 2 about the pivot axis X71, the pressure unit 40 separates away from the heating roller 30. In other words, the arm 71 supports the pressure unit 40 so that the heating roller 30 and the pressure unit 40 can approach each other and can separate from each other.

The tension coil spring 73 is in engagement with an upper end of the arm 71 and an upper-front corner of the fixing frame 80. A protrusion 71C is fixed to a portion of the arm 71 near the upper end thereof and protrudes frontward therefrom.

The cam 75 is supported by the fixing frame 80 so as to be pivotally movable less than one revolution about a cam axis X75 that is positioned further frontward than the protrusion 71C. The cam 75 has a cam surface 75C. The cam surface 75C is a curved surface whose distance from the cam axis X75 increases as extending counterclockwise in FIG. 2 about the cam axis X75.

The tension coil spring 73 causes the arm 71 to pivotally move counterclockwise in FIG. 2 about the pivot axis X71 to press the protrusion 71C against the cam surface 75C.

In a state where a first portion 75C1 of the cam surface 75C is in contact with the protrusion 71C as illustrated in FIG. 2, the urging mechanisms 70 exert a first urging force F1 on the pressure unit 40 for pressing the pressure unit 40 against the heating roller 30.

Figure 6:
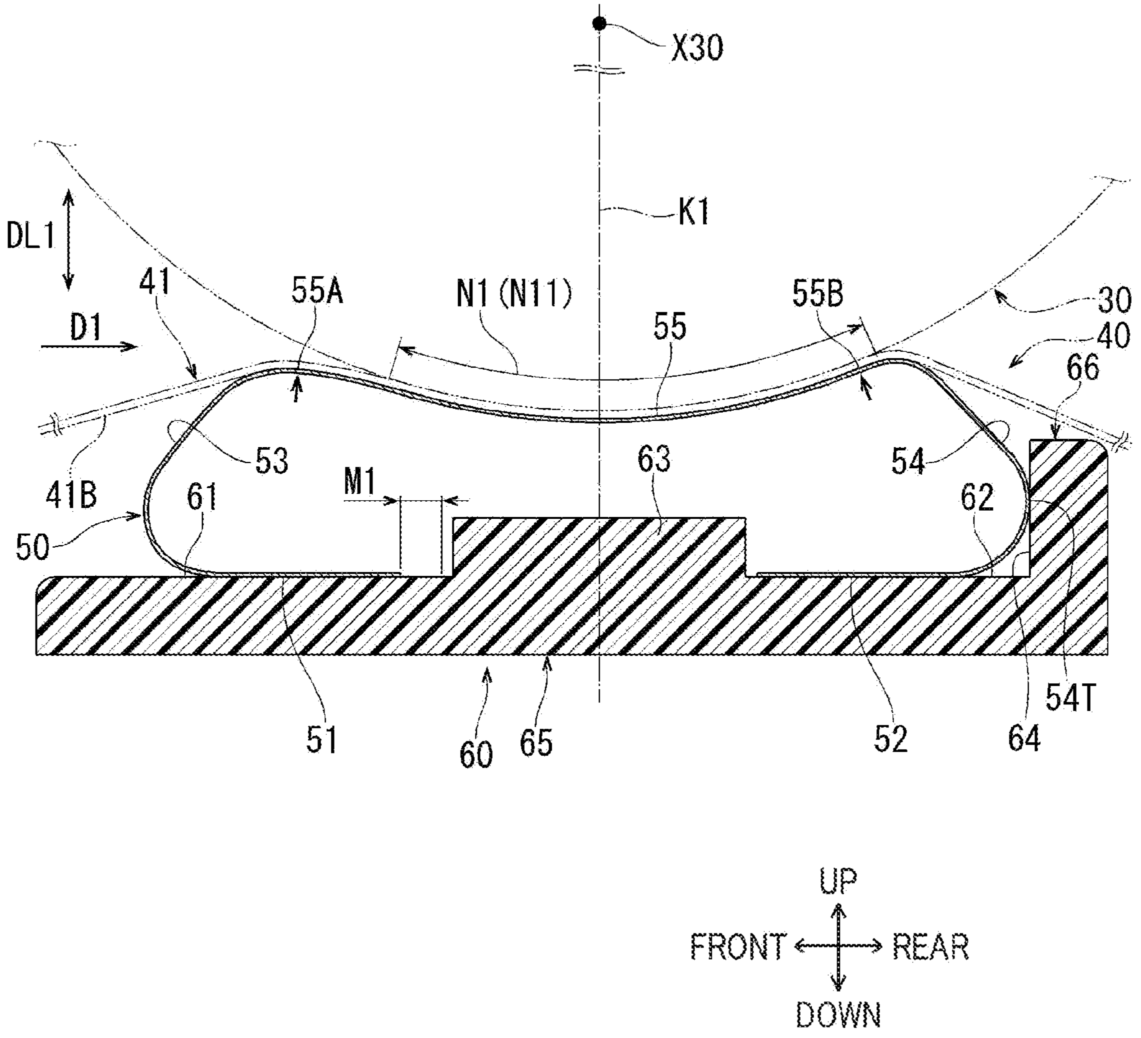
FIG. 6 is a schematic partial cross-sectional view of a heating roller and the pressure unit in their normal pressure-contact mode.

As a result, the leaf spring 50 is elastically deformed to make contact with the inner peripheral surface 41B of the endless belt 41 to nip the endless belt 41 in cooperation with the heating roller 30, as illustrated in FIG. 6. Specifically, the heating roller 30 and a portion of the nip-forming surface 55 that excludes the upstream end 55A and its vicinity but that includes the downstream end 55B nip the endless belt 41 to form a nipping region N1 (N11) therebetween. That is, the nip-forming surface 55 has at least a portion for nipping the endless belt 41 in cooperation with the heating roller 30 to form the nipping region N1 between the nip-forming surface 55 and the heating roller 30.

In other words, when the leaf spring 50 is elastically deformed by the first urging force F1, the downstream end 55B in the conveying direction D1 of the nip-forming surface 55 constitutes the nipping region N1 (N11).

In this state, the upstream supported surface 51 has moved upstream in the conveying direction D1 by a distance M1.

A mode of the heating roller 30 and the pressure unit 40 when the urging mechanisms 70 exert the first urging force F1 will be referred to as a normal pressure-contact mode. In the normal pressure-contact mode, a surface pressure at the nipping region N1 (N11) is a prescribed magnitude suitable for normal paper having a common thickness.

Although not illustrated in the drawings, when the cam 75 pivotally moves clockwise in FIG. 2 and a second portion 75C2 of the cam surface 75C makes contact with the protrusion 71C, the urging mechanisms 70 exert a second urging force F2 for pressing the pressure unit 40 against the heating roller 30. The second urging force F2 is smaller than the first urging force F1.

Figure 7:
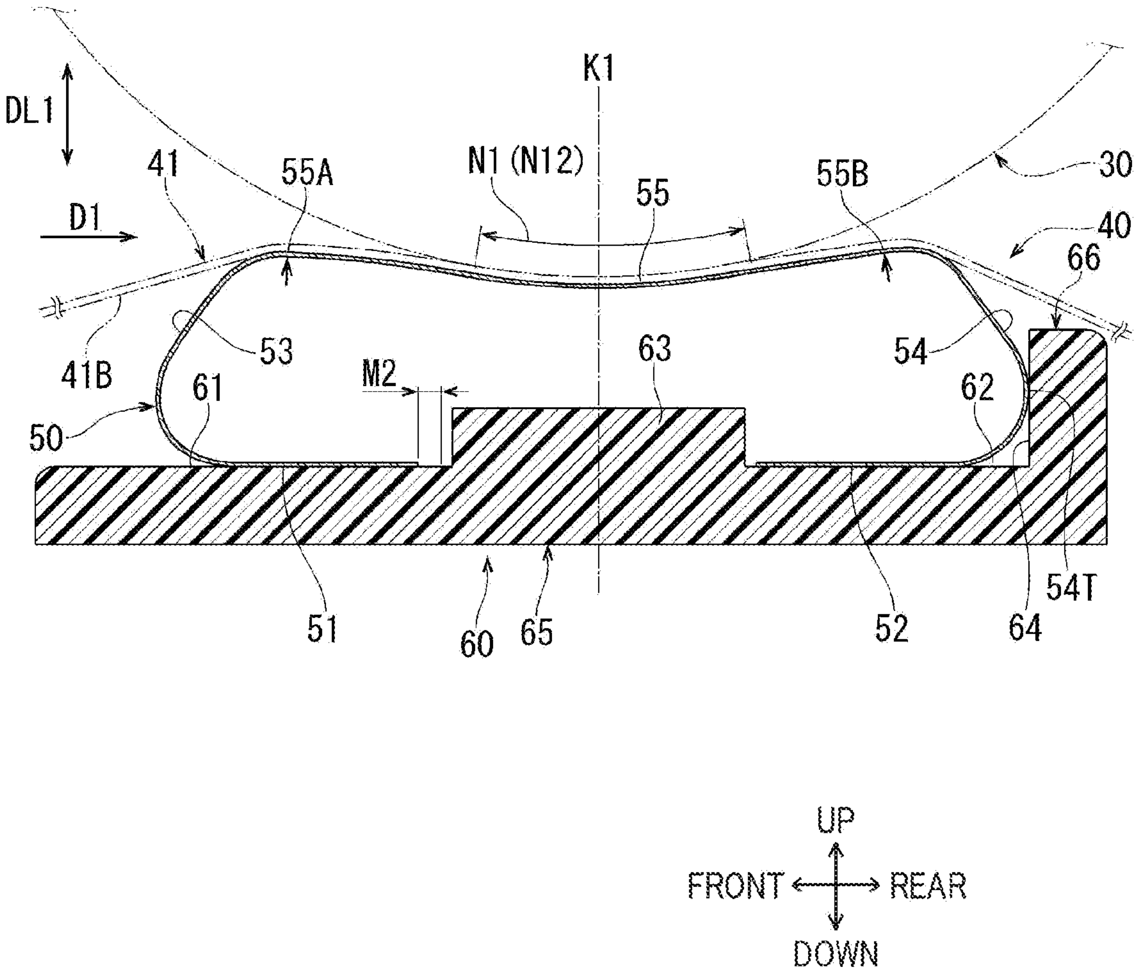
FIG. 7 is a schematic partial cross-sectional view of the heating roller and the pressure unit in their light pressure-contact mode.

As a result, the degree of elastic deformation in the leaf spring 50 becomes smaller, as illustrated in FIG. 7. Thus, the leaf spring 50 makes contact with the inner peripheral surface 41B of the endless belt 41 so that the endless belt 41 is nipped between the heating roller 30 and the leaf spring 50 over a shorter range. In this state, the heating roller 30 and a portion of the nip-forming surface 55 that excludes the upstream end 55A and its vicinity and the downstream end 55B and its vicinity nip the endless belt 41 to form a nipping region N1 (N12) therebetween.

In other words, when the leaf spring 50 is elastically deformed by the second urging force F2, the downstream end 55B in the conveying direction D1 of the nip-forming surface 55 does not constitute the nipping region N1 (N12).

In this state, the upstream supported surface 51 has moved upstream in the conveying direction D1 by a distance M2 that is smaller than the distance M1 (M2<M1).

The mode of the heating roller 30 and the pressure unit 40 when the urging mechanisms 70 exert the second urging force F2 will be referred to as a light pressure-contact mode. In the light pressure-contact mode, the surface pressure at the nipping region N1 (N12) is smaller than that at the nipping region N1 (N11) in the normal pressure-contact mode and is suitable for envelopes, thick paper, and the like which are thicker than normal paper.

Figure 8:
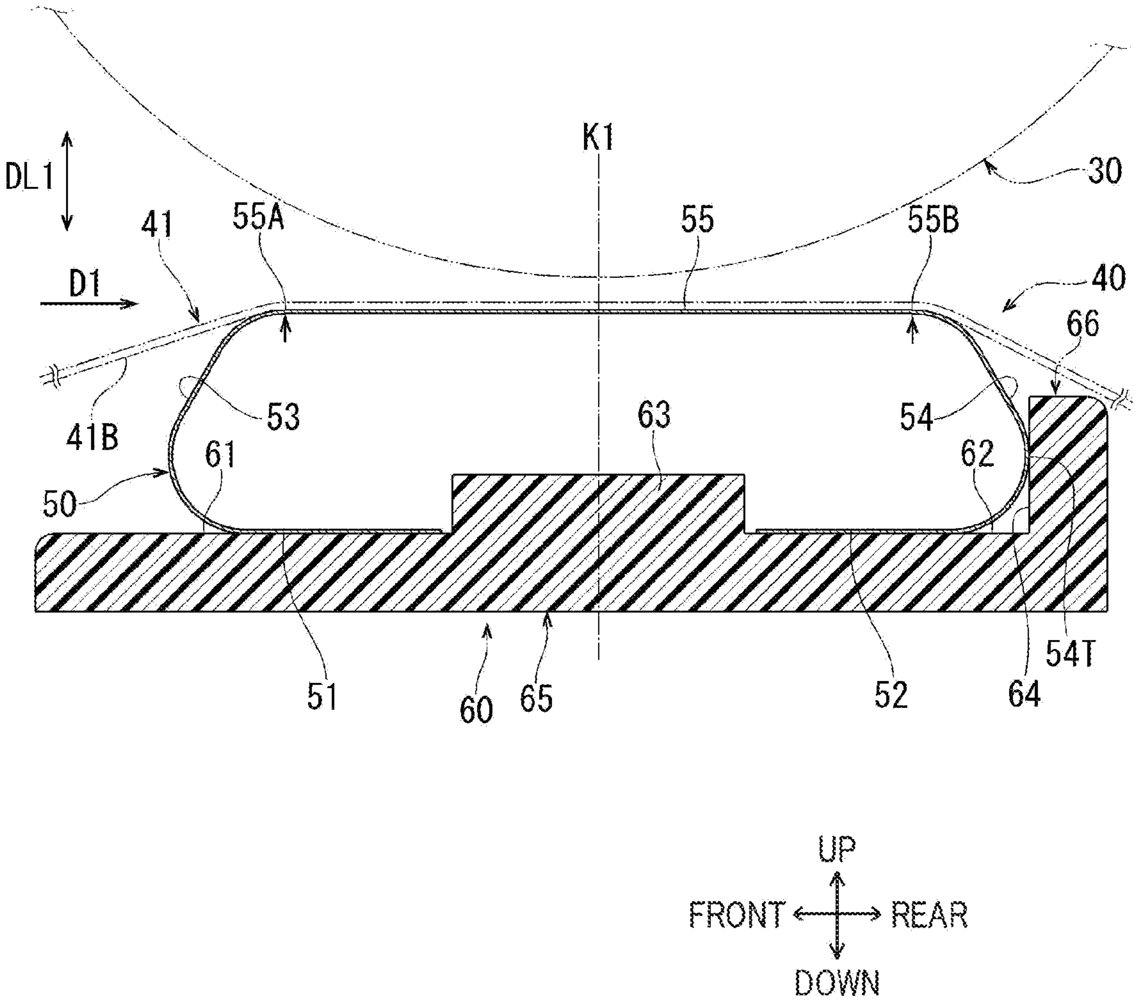
FIG. 8 is a schematic partial cross-sectional view of the heating roller and the pressure unit in their separation mode.

Although not illustrated in the drawings, when the cam 75 further pivotally moves clockwise in FIG. 2 and a third portion 75C3 of the cam surface 75C makes contact with the protrusion 71C, the heating roller 30 and the endless belt 41 separates from each other as illustrated in FIG. 8, and an urging force exerted by the urging mechanisms 70 becomes zero.

The mode of the heating roller 30 and the pressure unit 40 illustrated in FIG. 8 will be referred to as a separation mode. In a case where the sheet SH becomes jammed between the heating roller 30 and the pressure unit 40 in the normal pressure-contact mode or the light pressure-contact mode, the sheet SH can be extracted from a portion between the heating roller 30 and the pressure unit 40 by switching the mode of the heating roller 30 and the pressure unit 40 to the separation mode.

As described above, the urging mechanisms 70 can exert selected one of the first urging force F1, the second urging force F2, or zero force in order to switch the mode of the heating roller 30 and the pressure unit 40 among the normal pressure-contact mode, the light pressure-contact mode, and the separation mode.

Figure 9:
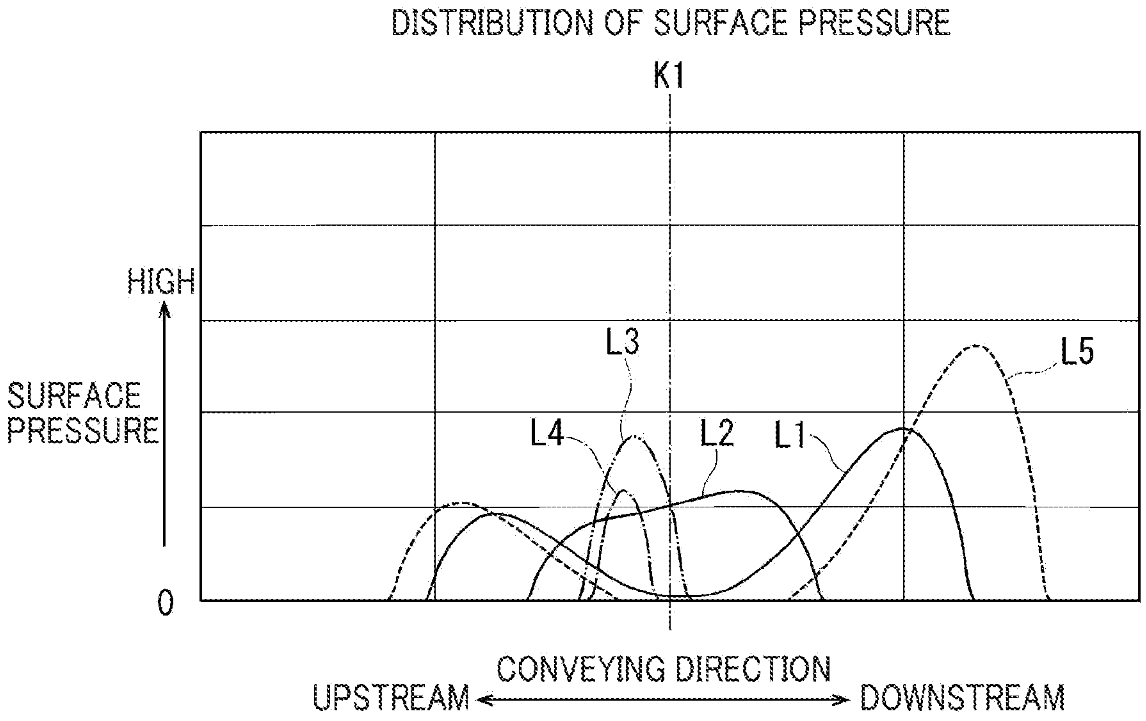
FIG. 9 is a graph showing distribution of surface pressure along a conveying direction in a nipping region.

A solid line L1 in FIG. 9 illustrates one example of distribution of surface pressure in the conveying direction D1 at the nipping region N1 (N11) when the urging mechanisms 70 exert the first urging force F1 as illustrated in FIG. 6.

A solid line L2 in FIG. 9 illustrates one example of distribution of surface pressure in the conveying direction D1 at the nipping region N1 (N12) when the urging mechanisms 70 exert the second urging force F2 as illustrated in FIG. 7. In this example, the second urging force F2 is ⅔ of the first urging force F1.

A two-dotted chain line L3 in FIG. 9 illustrates one example of distribution of surface pressure in the conveying direction D1 at the nipping region N1 when the urging force by the urging mechanisms 70 is ⅓ of the first urging force F1.

A one-dotted chain line L4 in FIG. 9 illustrates one example of distribution of surface pressure in the conveying direction D1 at the nipping region N1 when the urging force by the urging mechanisms 70 is ²⁄₁₅ of the first urging force F1.

A broken line L5 in FIG. 9 illustrates one example of distribution of surface pressure in the conveying direction D1 at the nipping region N1 when the urging force by the urging mechanisms 70 is 4/3 of the first urging force F1.

OPERATIONS AND ADVANTAGES OF EMBODIMENT

In the leaf spring 50 of the fixing device 7 according to the embodiment, as illustrated in FIG. 5, the upstream supported surface 51 is in contact with and supported by the upstream supporting surface 61, the downstream supported surface 52 is in contact with and supported by the downstream supporting surface 62, and the downstream connecting surface 54 is in contact with and supported by the restricting surface 64. In other words, the leaf spring 50 is supported by the holder 60 through contact with the holder 60 at three positions.

With this configuration, when the leaf spring 50 is elastically deformed, as illustrated in FIGS. 6 and 7, the fixing device 7 can reliably suppress the downstream end 55B in the conveying direction D1 of the nip-forming surface 55 from separating from the heating roller 30 and can reliably maintain the nip-forming surface 55 in a curved state along an outer circumferential surface of the heating roller 30.

As a result, the fixing device 7 can increase a surface area of a portion of the nip-forming surface 55 that nips the endless belt 41 in cooperation with the heating roller 30.

Hence, the fixing device 7 can increase the length in the conveying direction D1 of the nipping region N1, thereby improving the ability of the fixing device 7 to fix toner images.

The endless belt 41 is circularly movable satisfactorily in the fixing device 7 while sliding over the leaf spring 50. Therefore, the fixing device 7 does not need a sliding sheet between the endless belt 41 and the leaf spring 50, thereby reducing the number of components required in the fixing device 7 and lowering the manufacturing cost. Moreover, the above arrangement can alleviate stress concentrations in the heating roller 30 and the endless belt 41 and enable the endless belt 41 to adapt to changes in the urging force of the urging mechanisms 70 in comparison with a configuration where a rubber block-like elastic body is used instead of the leaf spring 50.

As illustrated in FIG. 5, in the fixing device 7, the downstream supported surface 52 is restricted by the restricting surface 64 and the surface of the projection 63 that faces downstream in the conveying direction D1 so that the downstream supported surface 52 is in contact with the downstream supporting surface 62 while the downstream supported surface 52 is not movable in the conveying direction D1.

This configuration reliably ensures that the peak of surface pressure in the nipping region N1 (N11, N12) while a sheet SH is nipped is positioned downstream from the center in the conveying direction D1 of the nip-forming surface 55 as illustrated by the solid lines L1 and L2 in FIG. 9, and can suppress variations in these peak positions along the conveying direction D1. As a result, the fixing device 7 can achieve a further improved ability to fix toner images, for example, the glossy appearance of thermally fixed toner images.

As illustrated in FIG. 5, the upstream supported surface 51 of the fixing device 7 is in contact with the upstream supporting surface 61 while the upstream supported surface 51 is movable upstream in the conveying direction D1. In a state where the leaf spring 50 is elastically deformed by the first urging force F1 as illustrated in FIG. 6, the upstream supported surface 51 moves upstream in the conveying direction D1 by the distance M1. In a state where the leaf spring 50 is elastically deformed by the second urging force F2 as illustrated in FIG. 7, the upstream supported surface 51 moves upstream in the conveying direction D1 by the distance M2 (M2<M1).

This configuration can reduce the surface pressure within the nipping region N1 (N11, N12) upstream of the center in the conveying direction D1 of the nip-forming surface 55 as indicated by the solid lines L1 and L2 in FIG. 9. As a result, the fixing device 7 can easily draw the sheet SH into the nipping region N1, thereby improving conveying performance of the sheets SH.

The holder 60 in the fixing device 7 has the restricting surface 64, as illustrated in FIG. 5. With this configuration, accuracy in positions of the downstream supporting surface 62 and the restricting surface 64 which are both provided on the holder 60 can be improved.

In a state where the leaf spring 50 in the fixing device 7 is not elastically deformed, the portion 54T of the downstream connecting surface 54 that makes contact with the restricting surface 64 is positioned closer to the downstream supported surface 52 than to the nip-forming surface 55 in the direction DLI in which the heating roller 30 and the pressure unit 40 are aligned. This configuration increases the length in the portion of the downstream connecting surface 54 that deforms in response to deformation of the nip-forming surface 55, and enables the nip-forming surface 55 to deform along the outer circumferential surface of the heating roller 30 more easily. As a result, the fixing device 7 can further increase the length in the conveying direction D1 of the nipping region N1.

In a state where the leaf spring 50 in the fixing device 7 is not elastically deformed as illustrated in FIG. 5, the nip-forming surface 55 is formed in a straight line from the upstream end 55A to the downstream end 55B in the conveying direction D1 when viewed in the rotational axis X30 direction. With this configuration, the fixing device 7 can more easily draw the sheet SH into the nipping region N1, thereby improving conveying performance of the sheets SH.

When the leaf spring 50 is elastically deformed in the fixing device 7 by the first urging force F1 exerted by the urging mechanisms 70, as illustrated in FIG. 6, the downstream end 55B in the conveying direction D1 of the nip-forming surface 55 constitutes the nipping region N1 (N11). This configuration can position the peak of surface pressure in the nipping region N1 (N11) near the downstream end 55B in the conveying direction D1 of the nip-forming surface 55 as indicated by the solid line L1 in FIG. 9. In other words, the surface pressure in the nipping region N1 (N11) can be increased at an side of the exit of the nipping region N1 (N11), thereby further improving the performance of the fixing device 7 for fixing toner images.

When the leaf spring 50 is elastically deformed in the fixing device 7 by the second urging force F2 exerted by the urging mechanisms 70 as illustrated in FIG. 7, the downstream end 55B in the conveying direction D1 of the nip-forming surface 55 does not form the nipping region N1 (N12). Thus, the urging mechanisms 70 exert the first urging force F1 to switch the mode of the heating roller 30 and the pressure unit 40 to the normal pressure-contact mode when normal sheets SH are conveyed therebetween, and exert the second urging force F2 to switch the mode of the heating roller 30 and the pressure unit 40 to the light pressure-contact mode when sheets SH thicker than normal sheets SH, such as envelopes or thick paper, are conveyed therebetween, thereby restraining creases from being produced in the envelopes or the like.

Since the leaf spring 50 in the fixing device 7 is made of stainless steel that exhibits good elastic force, the nip-forming surface 55 can be easily elastically deformed so that the nip-forming surface 55 is curved along the outer circumferential surface of the heating roller 30.

Modifications

Figure 10:
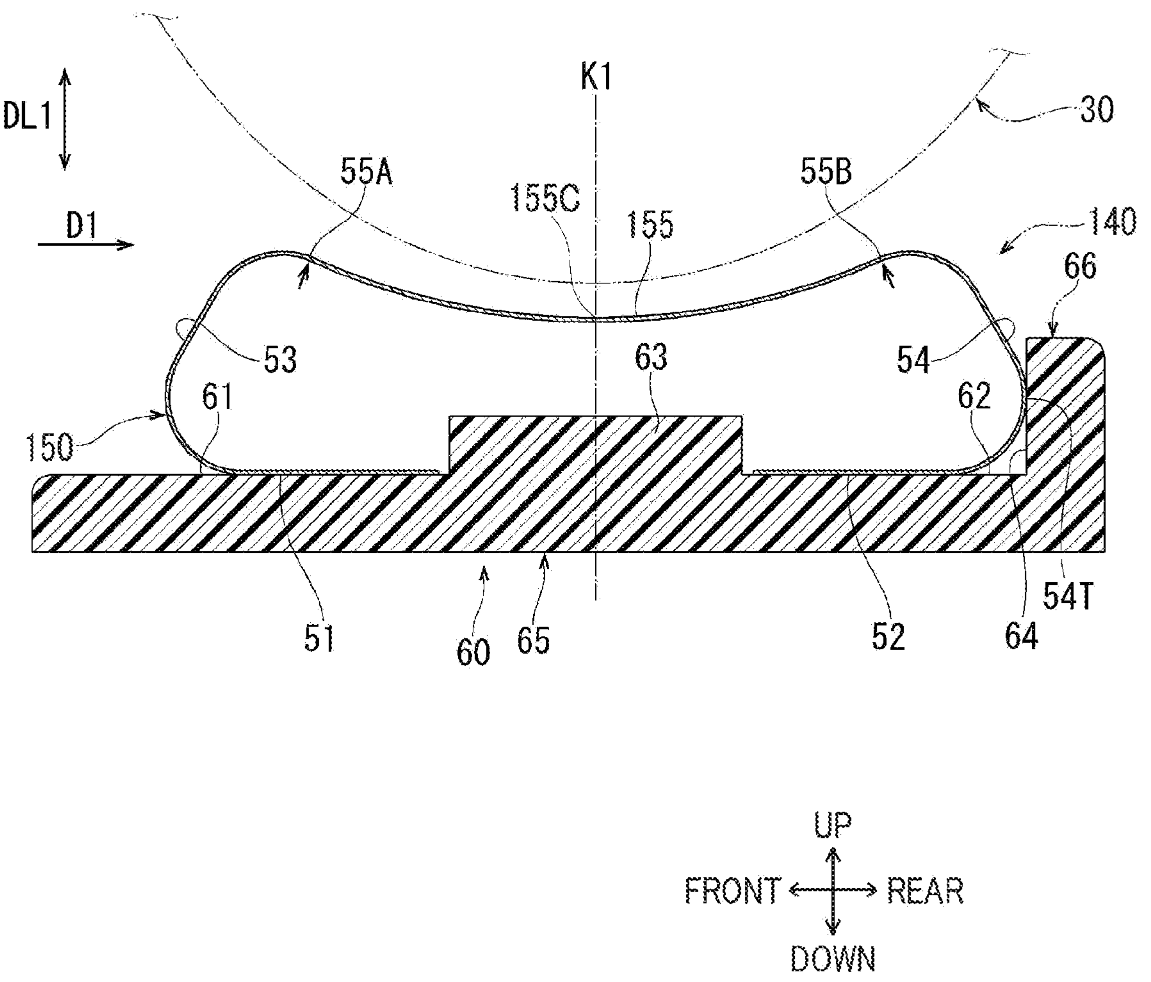
FIG. 10 is schematic partial cross-sectional view of the heating roller and a pressure unit in their separation mode, and illustrating a configuration in which a nip-forming surface is curved.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

FIG. 10 illustrates a modification in which a leaf spring 150 is employed in a pressure unit 140 in place of the leaf spring 50 of the pressure unit 40 in the embodiment. In a state where the leaf spring 150 is not elastically deformed, a nip-forming surface 155 of the leaf spring 150 is formed in a curved shape in which a middle portion 155C in the conveying direction D1 of the nip-forming surface 155 is separated from the heating roller 30 when viewed in the rotational axis X30 direction.

The holder 60 in the above embodiment has the restricting surface 64 as illustrated in FIG. 5, but the present disclosure need not be limited to this configuration. For example, the opposing surface 46A of the second belt guide 46 may serve as the restricting surface that makes contact with the downstream connecting surface 54 of the leaf spring 50.

In the embodiment described above, the center in the conveying direction D1 of the nip-forming surface 55 of the leaf spring 50 is positioned on the virtual line K1. However, the present disclosure need not be limited to this configuration. For example, the center in the conveying direction D1 of the nip-forming surface 55 may be positioned either further upstream or downstream than the virtual line K1 in the conveying direction D1.

Although the upstream supporting surface 61 and the downstream supporting surface 62 are arranged on the same plane and separated from each other by the projection 63 in the above embodiment, the present disclosure need not be limited to this configuration. For example, the projection may be omitted and the upstream supporting surface and the downstream supporting surface may be formed as a continuous flat surface. Alternatively, the upstream supporting surface may be arranged a step lower or a step higher than the downstream supporting surface.

In the fixing device 7 of the above embodiment, a sliding sheet is not provided between the endless belt 41 and the leaf spring 50. However, the present disclosure may be applied to a configuration that employs a sliding sheet between the endless belt and the plate-shaped elastic body.

In addition to the image-forming apparatus described in the above embodiment, the present disclosure may be employed in a multifunction peripheral or the like having image-forming function and image-reading function.

What is claimed is:

1. A fixing device comprising:

a heating roller rotatable about a rotational axis extending in a rotational axis direction; and a pressure unit configured to nip a sheet and convey the sheet in a conveying direction in cooperation with the heating roller and to thermally fix a toner image onto the sheet, the pressure unit comprising:

an endless belt circularly movable while in contact with the heating roller;

an elastic plate extending in the rotational axis direction, the elastic plate making contact with an inner peripheral surface of the endless belt to nip the endless belt in cooperation with the heating roller, the elastic plate having:

an outer surface having a portion that makes contact with the inner peripheral surface of the endless belt; and an inner surface which is an opposite surface of the outer surface; and a holder extending in the rotational axis direction, the holder being positioned within a space encircled by the endless belt and supporting the elastic plate, the holder having:

an upstream supporting surface facing the heating roller; and a downstream supporting surface positioned further downstream than the upstream supporting surface in the conveying direction, the downstream supporting surface facing the heating roller, wherein the outer surface of the elastic plate has:

a nip-forming surface having at least a portion for nipping the endless belt in cooperation with the heating roller to form a nipping region between the nip-forming surface and the heating roller;

an upstream supported surface in contact with and supported by the upstream supporting surface;

a downstream supported surface in contact with and supported by the downstream supporting surface;

an upstream connecting surface connecting the nip-forming surface and the upstream supported surface to each other, the upstream connecting surface being curved when viewed in the rotational axis direction; and a downstream connecting surface connecting the nip-forming surface and the downstream supported surface to each other, the downstream connecting surface being curved when viewed in the rotational axis direction.

2. The fixing device according to claim 1, wherein the upstream connecting surface is positioned further upstream than the nip-forming surface in the conveying direction, and wherein the upstream connecting surface is curved so as to expand upstream in the conveying direction.

3. The fixing device according to claim 1, wherein the downstream connecting surface is positioned further downstream than the nip-forming surface in the conveying direction, and wherein the downstream connecting surface is curved so as to expand downstream in the conveying direction.

4. The fixing device according to claim 3, wherein the pressure unit further comprises:

a restricting surface positioned further downstream than the downstream supporting surface in the conveying direction and positioned closer to the heating roller than the downstream supporting surface is to the heating roller, the restricting surface facing upstream in the conveying direction, and wherein the downstream connecting surface is in contact with the restricting surface.

5. The fixing device according to claim 1, wherein the downstream supported surface is in contact with the downstream supporting surface while the downstream supported surface is not movable in the conveying direction.

6. The fixing device according to claim 1, wherein the upstream supported surface is in contact with the upstream supporting surface while the upstream supported surface is movable upstream in the conveying direction.

7. The fixing device according to claim 4, wherein the holder has the restricting surface.

8. The fixing device according to claim 4, wherein the downstream connecting surface has a portion that makes contact with the restricting surface, and wherein, in a state where the elastic plate is not elastically deformed, the portion is positioned closer to the downstream supported surface than to the nip-forming surface in a direction in which the heating roller and the pressure unit are aligned.

9. The fixing device according to claim 1, wherein, when viewed in the rotational axis direction in a state where the elastic plate is not elastically deformed, the nip-forming surface is formed in one of a linear shape, and a curved shape in which a middle portion in the conveying direction of the nip-forming surface is separated from the heating roller.

10. The fixing device according to claim 9, further comprising an urging mechanism supporting the pressure unit so that the heating roller and the pressure unit can approach each other and separate away from each other, the urging mechanism can exert a first urging force for pressing the pressure unit against the heating roller, wherein, when the elastic plate is elastically deformed by the first urging force, a downstream end in the conveying direction of the nip-forming surface constitutes the nipping region.

11. The fixing device according to claim 10, wherein the urging mechanism is configured to exert selected one of the first urging force, and a second urging force for pressing the pressure unit against the heating roller, the second urging force being smaller than the first urging force, and wherein, when the elastic plate is elastically deformed by the second urging force, the downstream end in the conveying direction of the nip-forming surface does not constitute the nipping region.

12. The fixing device according to claim 1, further comprising a belt guide that makes contact with the inner peripheral surface of the endless belt, wherein the belt guide has a portion that protrudes to a position closer to the heating roller than the holder is to the heating roller.

13. The fixing device according to claim 1, wherein the elastic plate is a leaf spring that is made of metal material.

14. A fixing device comprising:

a heating roller rotatable about a rotational axis extending in a rotational axis direction; and a pressure unit configured to nip a sheet and convey the sheet in a conveying direction in cooperation with the heating roller and to thermally fix a toner image onto the sheet, the pressure unit comprising:

an endless belt circularly movable while in contact with the heating roller;

an elastic plate extending in the rotational axis direction, the elastic plate making contact with an inner peripheral surface of the endless belt to nip the endless belt in cooperation with the heating roller; and a holder extending in the rotational axis direction, the holder being positioned within a space encircled by the endless belt and supporting the elastic plate, the holder having:

an upstream supporting surface facing the heating roller; and a downstream supporting surface positioned further downstream than the upstream supporting surface in the conveying direction, the downstream supporting surface facing the heating roller, wherein the elastic plate has:

a nip-forming surface having at least a portion for nipping the endless belt in cooperation with the heating roller to form a nipping region between the nip-forming surface and the heating roller;

an upstream supported surface in contact with and supported by the upstream supporting surface;

a downstream supported surface in contact with and supported by the downstream supporting surface;

an upstream connecting surface connecting the nip-forming surface and the upstream supported surface to each other, the upstream connecting surface being curved when viewed in the rotational axis direction; and a downstream connecting surface connecting the nip-forming surface and the downstream supported surface to each other, the downstream connecting surface being curved when viewed in the rotational axis direction, wherein the downstream connecting surface is positioned further downstream than the nip-forming surface in the conveying direction, wherein the downstream connecting surface is curved so as to expand downstream in the conveying direction, wherein the pressure unit further comprises:

a restricting surface positioned further downstream than the downstream supporting surface in the conveying direction and positioned closer to the heating roller than the downstream supporting surface is to the heating roller, the restricting surface facing upstream in the conveying direction, and wherein the downstream connecting surface is in contact with the restricting surface.

15. The fixing device according to claim 14, wherein the upstream connecting surface is positioned further upstream than the nip-forming surface in the conveying direction, and wherein the upstream connecting surface is curved so as to expand upstream in the conveying direction.

16. The fixing device according to claim 14, wherein the downstream supported surface is in contact with the downstream supporting surface while the downstream supported surface is not movable in the conveying direction.

17. The fixing device according to claim 14, wherein the upstream supported surface is in contact with the upstream supporting surface while the upstream supported surface is movable upstream in the conveying direction.

18. The fixing device according to claim 14, wherein the holder has the restricting surface.

19. The fixing device according to claim 14, wherein the elastic plate is made of stainless steel.

20. A fixing device comprising:

a heating roller rotatable about a rotational axis extending in a rotational axis direction;

a pressure unit configured to nip a sheet and convey the sheet in a conveying direction in cooperation with the heating roller and to thermally fix a toner image onto the sheet, the pressure unit comprising:

an endless belt circularly movable while in contact with the heating roller;

an elastic plate extending in the rotational axis direction, the elastic plate making contact with an inner peripheral surface of the endless belt to nip the endless belt in cooperation with the heating roller; and a holder extending in the rotational axis direction, the holder being positioned within a space encircled by the endless belt and supporting the elastic plate, the holder having:

an upstream supporting surface facing the heating roller; and a downstream supporting surface positioned further downstream than the upstream supporting surface in the conveying direction, the downstream supporting surface facing the heating roller; and an urging mechanism supporting the pressure unit so that the heating roller and the pressure unit can approach each other and separate away from each other, the urging mechanism can exert a first urging force for pressing the pressure unit against the heating roller, wherein the elastic plate has:

a nip-forming surface having at least a portion for nipping the endless belt in cooperation with the heating roller to form a nipping region between the nip-forming surface and the heating roller;

an upstream supported surface in contact with and supported by the upstream supporting surface;

a downstream supported surface in contact with and supported by the downstream supporting surface;

an upstream connecting surface connecting the nip-forming surface and the upstream supported surface to each other, the upstream connecting surface being curved when viewed in the rotational axis direction; and a downstream connecting surface connecting the nip-forming surface and the downstream supported surface to each other, the downstream connecting surface being curved when viewed in the rotational axis direction, wherein, when viewed in the rotational axis direction in a state where the elastic plate is not elastically deformed, the nip-forming surface is formed in one of a linear shape, and a curved shape in which a middle portion in the conveying direction of the nip-forming surface is separated from the heating roller, wherein, when the elastic plate is elastically deformed by the first urging force, a downstream end in the conveying direction of the nip-forming surface constitutes the nipping region, wherein the urging mechanism is configured to exert selected one of the first urging force, and a second urging force for pressing the pressure unit against the heating roller, the second urging force being smaller than the first urging force, and wherein, when the elastic plate is elastically deformed by the second urging force, the downstream end in the conveying direction of the nip-forming surface does not constitute the nipping region.

* * * * *